Aug. 23, 1960    G. SACHSENRÖDER, SR., ET AL    2,949,630
TYING PLIABLE CONTAINERS
Filed March 19, 1956    5 Sheets-Sheet 1
Fig. 1
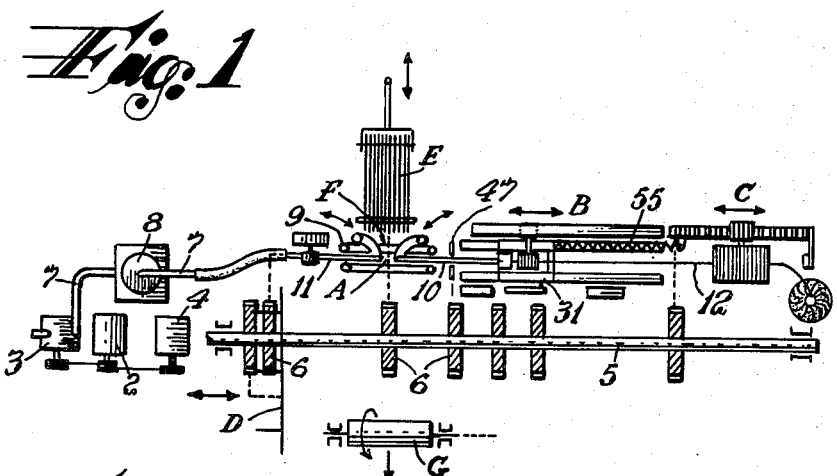
Fig. 1a
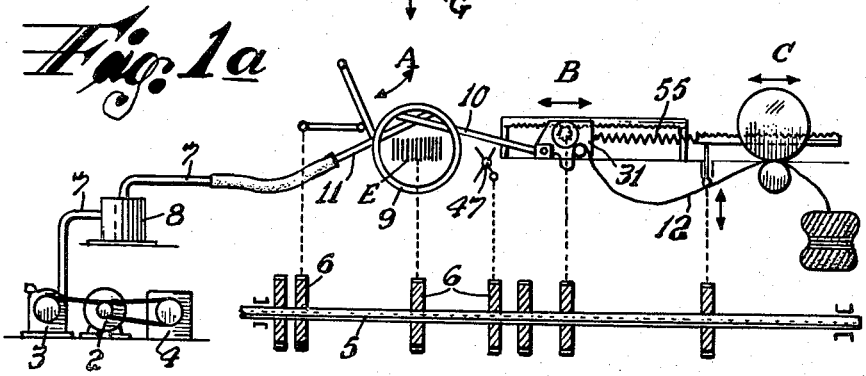
Fig. 2
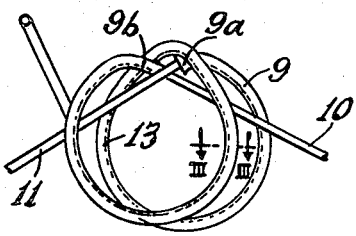
Fig. 3
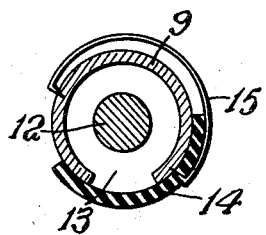
INVENTORS.
Gustav Sachsenröder, Sr.
BY Theodor Schröder
Richard Ernst agt Aug. 23, 1960   G. SACHSENRÖDER, SR., ET AL   2,949,630
TYING PLIABLE CONTAINERS
Filed March 19, 1956   5 Sheets-Sheet 2
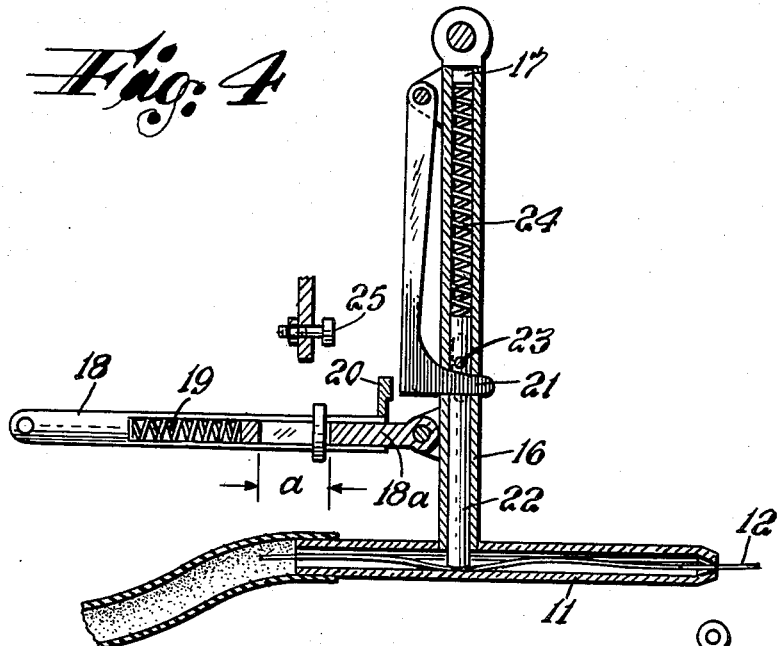
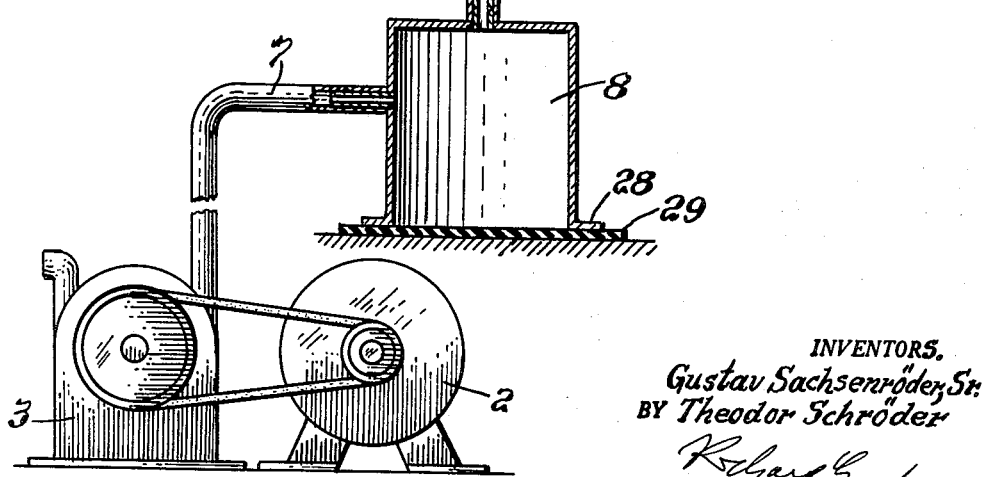
INVENTORS.
Gustav Sachsenröder, Sr.
BY Theodor Schröder

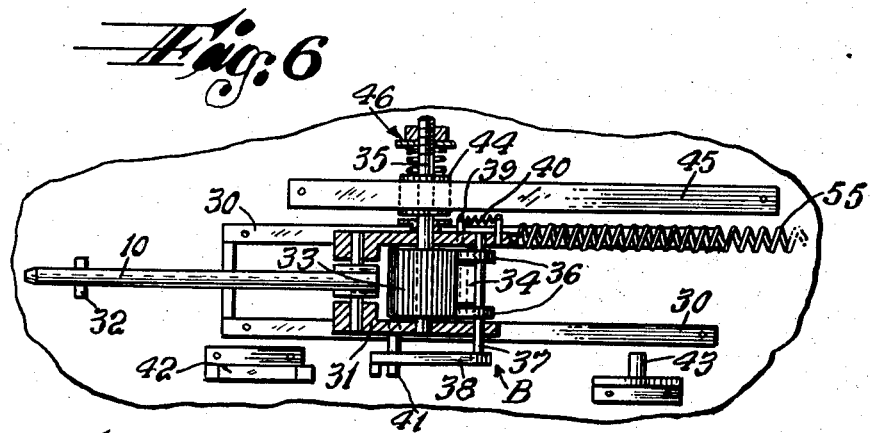
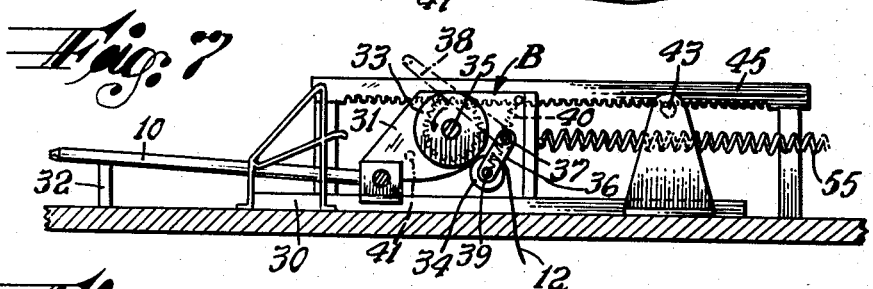
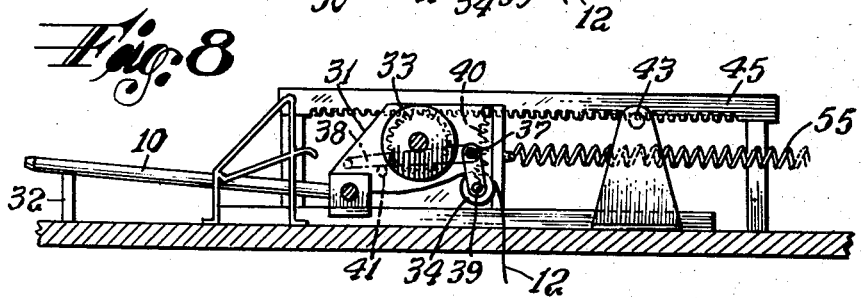
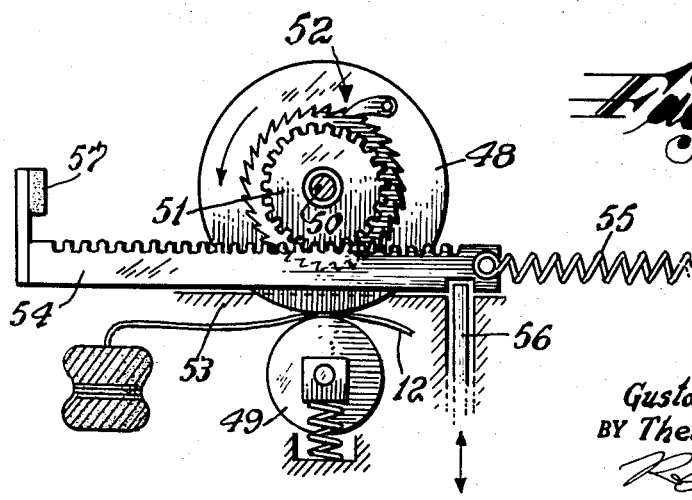

INVENTORS.
Gustav Sachsenröder, Sr.
BY Theodor Schröder

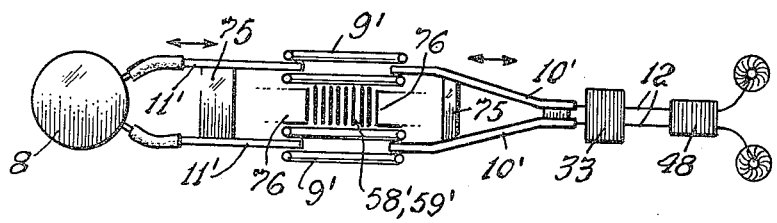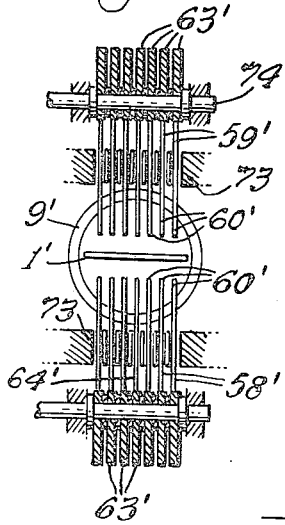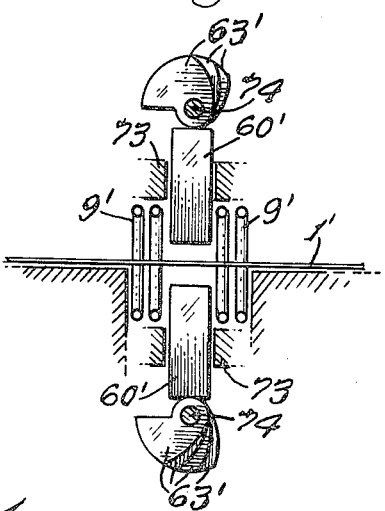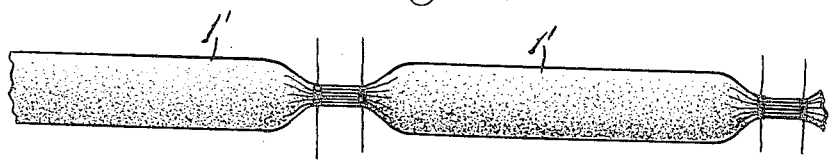

United States Patent Office 2,949,630
Patented Aug. 23, 1960

2,949,630

TYING PLIABLE CONTAINERS

Gustav Sachsenröder, Sr., 305 Friedrich-Engels-Allee, Wuppertal-Barmen, Germany, and Theodor Schröder, 33 Kampchen, Wuppertal-Beyenburg, Germany Filed Mar. 19, 1956, Ser. No. 572,251

Claims priority, application Germany Mar. 25, 1955

10 Claims. (Cl. 17—34)

This invention relates to a machine for the tying of the ends of containers of a pliable material with a thread, cord or the like, and more particularly for the tying of sausage casing. Wherever in this description and in the appended claims the term "container" is used, it is intended to mean containers of circular, noncircular or any irregular cross section. Our machine includes devices for the feeding and discharge of the containers, for the operations preparatory to the tying of a knot around an end portion of the container, and for the tying of the knot to close the container.

Known machines of this kind are equipped to tie one end of containers which have previously been cut to size. The individual containers are cut to size from continuous lengths of tubing, fed to the machine by hand, and then slid to the various work stations of the machine. For reasons of appearance, and also because of the danger of ripping the container if the container material is dry and relatively brittle, the end portion of the container is ordinarily plaited in pleats of uniform width by a device consisting of two meshing toothed rollers which, however, do not touch each other. The folds of the pleated end portion are compressed between a holder and a two-tine fork, and the compressed end is gripped by a clamp and pulled through the loops of a self-supporting knot of a thread, which loops are then tightened around the pleated end to form the tying knot. The loose ends of the thread are cut off, and the tied container is discharged from the machine into a bin. All operations are performed automatically except for the manual feeding of the containers.

The known device for tying the pleated end of a container consists of a looping head which, in turn, consists of a great many parts and is of relatively complex construction. The thread is unwound from a ball or bobbin and pulled through the looping head by a thread gripper. The looping head turns so that the thread end forms the figure eight, the loops of which are also set up straight by the looping head. A gripper clamp then reaches through the loops, grasps the pleated end of the container, and pulls it into the loops.

These machines of known design which are driven by individual electric motors require for the drive of all the work stations a multiplicity of spur gears, bevel gears, cams, eccentrics, controller cylinders or the like, rocking levers, and connecting rods in order to control the sequence of operations. They consist, therefore, of many parts, are of a complicated design, and require much floor space. Due to their purely mechanical principle and the required high speed of operation, they are subject to rapid wear. Because of their complex design and the high quality of workmanship necessary to ensure operation of the working cycle, the known machines are very expensive in first cost. The complexity makes them subject to frequent breakdowns, even when carefully maintained. This condtion is aggravated by the fact that the machine is continually contaminated by particles abraded from the threads during tying. The thread as well as the containers are subjected to severe stresses by jerking and undamped movements of the machine parts so that defective knots and torn containers frequently occur.

The primary object of our present invention is to provide a machine for the tying of the ends of containers of a pliable material, which is of simple construction and permits a high rate of production in uninterrupted operation and without injury to the containers.

To achieve this object, the machine according to the invention includes means for the preparation of the end of a container for tying, which means consist of a plaiting device and a press associated with the plaiting device. The plaiting device comprises two groups of plaiting blades, which are adapted to move from and toward each other. As the groups of blades move toward each other, with an end portion of a container between the groups, each blade of one group alternates with a blade of the other group. The blades of the two groups meet successively in such a manner that meeting starts at the center and progresses in outward directions. The machine also includes a device for forming a knot, which device consists of a tubing shaped to conform to an open or embryo knot. The loop-shaped tubing is slit along its inner periphery and is equipped with a movable feed and a movable discharge pipe. Both pipes are provided with devices for mechanically tightening the knot. The discharge pipe is connected to a vacuum pump for the purpose of sucking the tying thread through the knot-forming loop-shaped tubing. The needed length of the thread is measured.

The advantages accruing from our construction are not limited to achieving the primary object of the invention. Our machine permits continuous operation on filled or empty containers of any length, thus resulting not only in a substantial increase in the number of operating cycles per unit of time, due to the small number and the small masses of the moving parts of the machine and an almost instantaneous tying of knots, but also permitting a material increase in the amount of material processed. The machine of the invention also affords savings of weight and space over the known machines. It operates at a low noise level and is free of vibration. It requires but a minimum of maintenance and is self-cleaning since any loose thread particles which may form in the loop-shaped tubing by abrasion are sucked by the vacuum pump into a lint collector suitably arranged in the suction line. Any lengths of thread resulting from a misfeed or thread breakage are also collected there so that the machine in both cases remains fully operable. The thread-tensioning device of our machine is made readily adjustable so that it will control the tension according to the thickness and breaking strength of the thread.

With the plaiting device of our machine, a tearing of containers is almost impossible even when working with very delicate artificial sausage casing. The plaiting time is much reduced as compared with conventional plaiting devices. The plaiting device of the invention permits the achievement of a fat-tight seal even without a transverse fold by making the pleats decrease in width from the center toward both sides.

The specification is accompanied by drawings in which:

Fig. 1 schematically illustrates a machine for the tying of containers, especially sausage casing, embodying features of our invention, the machine being shown in plain view, partly in section, Fig. 1a shows the machine of Fig. 1 in side elevation;

Fig. 2 is a perspective view of the knot-forming mechanism of the machine of Fig. 1;

Fig. 3 is a cross section on an enlarged scale through one of the loops of the tubing constituting the mechanism of Fig. 2. The section being taken on line III—III;

Fig. 4 is a longitudinal section through a detail of the machine, namely, the thread discharge pipe;

Fig. 5 is a longitudinal section through the thread and lint collector of the machine;

Fig. 6 is a partially sectioned plan view of another detail, the thread feed pipe, also showing the thread-tensoning device;

Fig. 7 is an elevation of same;

Fig. 8 is a view similar to that of Fig. 7 but showing a different phase;

Fig. 9 is an elevation of the thread-measuring device;

Fig. 13 is a plan view of a modified plaiting device for continuous feed and tying adjacent ends of a continuous length of containers, also illustrating associated parts;

Fig. 14 is a sectional side elevation of same;

Fig. 15 is explanatory of the operation of the plaiting blades of the device of Figs. 13 and 14; and Fig. 16 illustrates a sausage casing as tied with the device of Figs. 13 to 15.

Figure 10:
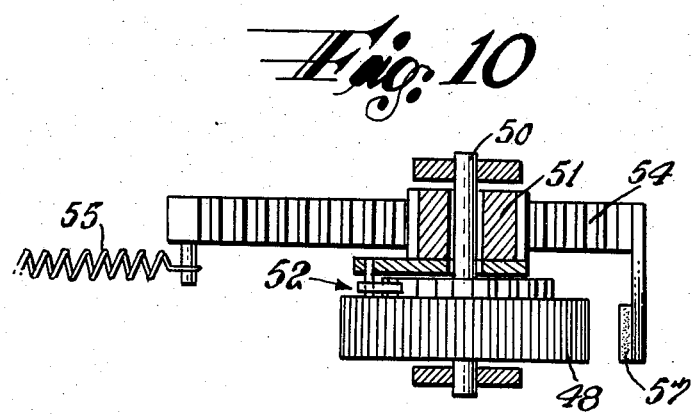
Fig. 10 is a plan view of same.

Referring to the drawings in greater detail, and initially to Figs. 1 and 1a, the machine shown serves to tie tubular containers, especially sausage casing, and consists essentially of a device for preparing the casings for tying, a device for forming the knots for the tying of the casings, and means for transporting the casings within the machine.

The totality of all the devices constitutes our machine. All devices are driven from a single electric motor 2 which is connected to a vacuum pump 3 by means of a V-belt drive, and also to a transmission 4, the driven shaft 5 of which drives and controls the various operating mechanisms in the proper sequence by means of gears 6. These motion-imparting parts are suitably connected to the individual devices. All the means for imparting and receiving motion and transmitting power are known and form no part of the subject matter of the present invention.

The device for forming a knot to tie the casings includes the vacuum pump 3, the knot-forming mechanism proper identified by A and known per se, a thread-tensioning device B, and a thread-measuring device C. Further, a thread collector 8 is provided in the line 7 between the knot-forming device A and the vacuum pump 3.

The device A for forming the knot consists essentially of a slitted tubing 9 shaped to conform to the knot in open or embryo condition (see Fig. 2). The loop-shaped tubing is slitted along its inner periphery and is connected at its ends 9a and 9b to a movable feed and discharge pipe 10 and 11, respectively, which pipes hold the typing material, such as a thread 12, a string, etc. The discharge pipe 11 is connected to the vacuum pump 3 which generates the flow of air necessary to transport the thread 12 and which sucks the thread through the tubing 9.

The tubing 9 which is shaped, as has been stated, to conform to the open knot has a radius of curvature that corresponds to the radius of the casing to be passed through the tubing and to be tied. The tubing may be bent to conform to any other container shape. In the example selected for illustration, the tubing has the usual form of a knot as used to tie sausage casing, and thus includes an intermediate loop portion, the corresponding thread part of which, upon drawing the thread taut, will press upon the knot formed and prevent unintentional untying. The tubing may have any other shape as well. The slitted tube is bent so that the slit 13 will be located along the inner periphery of the loops. When tension is applied to the thread 12 at both ends of the tubing 9, the tightening knot will slip out of the slit. The slit 13 must, therefore, be of such width that the thread will pass therethrough during tying without hindrance. In order to achieve a strong flow of air and minimize losses of vacuum so that a rapid and reliable passage of the thread 12 through the tubing 9 be ensured, the longitudinal slit 13 is covered by a band 14 of rubber or similar resilient material (see Fig. 3). This band is cemented to the outer wall of the pipe along one side of the slit or held in position along one side by clamps 15. It is necessary that the elasticity of the material selected for the band be sufficiently great so as not to interfere with the passing of the thread 12 through the slit 13 when the knot is tightened.

The ends 9a and 9b of the tubing 9 are spaced from each other so that the part of the thread 12, that will emerge from the intermediate loop, will not be caught by the ends 9a and 9b. We prefer to provide guides and deflectors (not shown) at or near the pipe ends 9a and 9b in order to assist the thread in passing through the slit. Both pipe ends 9a and 9b are flared into funnel shapes.

A discharge pipe 11 (Fig. 4) connects the end 9a with the vacuum pump and is provided with a swinging pipe 16 extending at right angles to the discharge pipe. The pipes 11 and 16 communicate with each other. The free end of the swinging pipe is sealed by a plug 17 that is provided with an eye by means of which the pipe 16 is pivoted on the machine frame (not illustrated). The discharge pipe can thus be swung in a vertical plane out of engagement with the tubing 9, which movement is imparted by a telescopic push rod 18, 18a articulated to the swinging pipe 16 and suitably linked to the output shaft 5 of the transmission gear 4. The two members 18 and 18a of the push rod are coupled so as to permit a play $a$ as an idling period, and are pressed apart by a spring 19. The driven member 18 of the push rod is provided at its free end with a stop 20 which is pressed against a lifting cam 21 pivoted on the swinging pipe 16 when the tapered end of the discharge pipe 11 fits into the funnel-shaped end 9a of the tubing 9 and the spring 19 is compressed by the continued movement of driven member 18. The action upon the cam 21 causes a rod 22 which is slidingly arranged within the pipe 16 and, under the force of the spring 24, normally shuts off the discharge pipe to rise and to open the pipe 11, allowing the thread 12 to be sucked therethrough. The rod 22 is raised by means of the pin 23 which cooperates with the cam 21. On the return stroke of the push rod 18, 18a, the cam 21 is pushed back into its starting position by the action of the spring 24 upon the rod 22, and the thread 12 is clamped tight in the discharge pipe 11 by the descending rod 22. There is an additional fixed stop 25 which acts on the cam 21 in the extreme swung-out position of the discharge pipe. The engagement of the cam 21 with the stop 25 causes the rod 22 in the extreme swung-out position of the discharge pipe to rise again, again releasing the thread end while air is simultaneously sucked through the pipe 11.

Abraded thread particles and loose thread ends are carried off toward the vacuum pump 3. To prevent the entrance of such foreign matter into the vacuum pump, a thread and lint collector 8 is placed between the discharge pipe 11 and the pump 3 (Fig. 5). The collector 8 is a cylindrical vessel that is open at one end. The flexible vacuum line 7 from the discharge pipe 11 enters through the top 26, and a connecting piece 27 in the cylindrical wall of the thread collector 8 communicates with the continuation of the line 7 leading to the pump 3. The open end 28 is flat and rests on an elastic support 29 which may, for example, be of rubber so that an airtight closure is assured when the vacuum pump runs. Foreign bodies carried along by suction collect on the elastic support of the thread collector 8 because they cannot be carried any further, due to the slow current of air in the cylindrical vessel, and are not sucked into the vacuum pump.

The thread 12 is fed to the other end 9b of the tubing 9, the end 9b being also flared to a funnel shape. A straight feed pipe 10 with a tapered end fits exactly into the funnel-shaped end 9b so as to assure a practically airtight connection (see Figs. 1 and 6 to 8). The feed pipe 10, at the end far from the loop-shaped tubing, is pivoted on a slide 31 arranged to slide on horizontal guide rails 30. Close to the opposite end of the feed pipe it is movably supported by a prop 32. The height of the support 32 is such that the feed pipe, as the slide 31 moves toward the tubing 9, is raised until the free end of the pipe 10 contacts the funnel-shaped end 9b of the tubing 9. The slide 31 is likewise actuated from the output shaft 5 of the transmission 4.

The length and bore of the feed pipe 10 are adjusted one to the other. Experience has shown that the bore of the pipe must surround the thread 12 tighter when the pipe is shorter, and vice versa. It is, therefore, advisable not to make the feed pipe 10 too short. Due to the nature of textile fibers, the thread used is never uniform so that variations in diameter must be expected. Such non-uniformity is of no consequence if the feed pipe is of adequate length to permit a bore with enough clearance around the thread 12. Portions of increased diameter can then be sucked through the pipe without difficulty.

Immediately behind the feed pipe 10, the slide 31 carries a device B for tensioning the thread 12. The tensioning device consists essentially of two parallel cylindrical rollers 33 and 34 of different diameter, the surface of both of which is slightly knurled or otherwise roughened. The larger roller 33 is rotatably mounted on a shaft 35 supported in the slide 31 at right angles to the travel direction of the slide. The shaft 35 projects laterally from the slide. The smaller roller 34 is mounted somewhat lower between two swinging arms 36 which are fixed in a parallel relationship on a shaft 37, the latter being supported in the slide 31. The shaft 37 projects from the other side of the slide 31 and the projecting portion carries an arm 38, at an angle of approximately 90° to the swinging arms 36. The shaft 39 of the smaller roller 34 is connected to the slide 31 by a helical spring 40 which extends laterally of the longitudinal axis of the swinging arms 36 and is fastened to the slide 31 at the side of the larger roller 33 so that the smaller roller 34 is urged into abutment against the larger roller 33 by the action of the spring 40. The position of roller abutment is shown in Fig. 7. When swinging away from the larger roller 33, the smaller roller 34 passes through its dead center and is again held by the helical spring 40 at a distance from the roller 33. The latter position which is shown in Fig. 8 is determined by the stop 41 against which the arm 38 abuts. This leaves a free space between the two rollers 33 and 34. The movement of the roller 34 is controlled in the extreme positions of the slide 31 by two spaced stationary stops 42 and 43 which switch the arm 38 and thus the smaller roller 34 from one extreme position to the other. The arrangement is such that the stop 42 pushes the roller 34 into engagement with the larger roller 33 when the slide 31 returns from its extreme forward position near the tubing 9, whereas stop 43 moves the smaller roller 34 away from the larger one when the slide 31 reaches its other extreme position far from the loop-shaped tubing. In this manner, the thread 12 which passes between the rollers 33 and 34 is clamped tight when the slide moves backwards, and is released when the slide moves forward.

Since the sliding back of the slide 31, with the thread 12 clamped between the rollers 33 and 34, is not sufficient to stretch the thread and to tighten the knot, we provide a thread-tensioning device. The shaft 35 of the larger roller 33 extends beyond the side of the slide 31 opposite the arm 38 and carries there a toothed wheel 44 which meshes throughout the entire travel of the slide 31 with a rack 45 fixedly provided above the shaft 35. As the slide 31 moves backward, the large roller 33 rotates in the direction of the arrow indicated in Fig. 7 and provides additional tension for the thread by pulling it along. To be sure not to break the thread 12 and in order to adjust the tension of the knot to the characteristics of the casing which is to be tied, we provide a slip clutch 46 with adjustable release for the larger roller between the toothed wheel 44 and the extension of the shaft 35.

Shears 47 (see Fig. 1) actuated from the output shaft 5 of the transmission 4 are arranged between the extreme position of the feed pipe 10 far from the tubing 9 and the tubing itself. The shears cut the thread towards the end of the backward move of the slide 31 and just behind the tapered end of the feed pipe 10 so that on further backward movement of the slide the larger roller 33 pulls the thread so far back that the thread end comes to rest just a short distance inside the free opening of the tapered end. Thus it is avoided that the thread becomes clamped between the feed pipe 10 and the corresponding end 9b of the tubing 9 when they meet again. The suction of the thread through the loops 9 will continue undisturbed.

While the thread 12 is sucked through the tubing 9, the feed pipe 10 and the slide 31 are in their extreme forward position closest to the tubing 9, and the two rollers 33 and 34 permit the thread 12 freely to run through between them. It is, therefore, necessary that the required length of thread for a single knot-tying be measured. For this purpose, we provide a thread-measuring device C (Figs. 1, 9 and 10) which is essentially similar to the thread-tensioning device B. It consists of two parallel rollers 48 and 49 of different diameter, between which the thread 12 passes on its way from a ball or bobbin to the feed pipe 10. The smaller roller 49 is pressed by a spring against the larger roller 48 so that the thread is prevented from sliding freely between the two rollers. The larger roller 48 is fixedly supported on the machine frame and has a knurled cylindrical surface. A pinion 51 is loosely mounted on the shaft 50 of the larger roller 48 and can be connected with the roller 48 in one direction of rotation by means of a pawl coupling. The pinion 51 meshes with a horizontal rack 54 which is slidably arranged below the pinion 51 in a stationary guide 53. The rack 54 which is parallel to the rack 45 of the thread-tensioning device B is connected with the slide 31 by means of a coil spring 55 and is held in its extreme position remote from the tubing 9 (Fig. 9) by a pin 56 that is operated by the output shaft 5 of the transmission 4. When the slide 31 has completed its movement toward the tubing 9, that is, when the feed pipe 10, with its tapered end, has engaged the funnel-shaped end 9b of the tubing 9, then the spring 55 attached to the rack 54 is tensioned. At the moment at which the thread 12 is aspirated, the pin 56 is pulled back and the spring 55 pulls the rack 54 toward the slide 31 so that the pinion 51 is made to turn, and the large roller 48 to be carried along by the coupling 52. Depending on the angle of rotation and the diameter of the roller 48, a predetermined length of thread is thus measured. In order to prevent overtravel of the roller 48 under its own momentum, the end of the rack 54 opposite to the point of attachment of the spring 55 is provided with a brake 57 which will be pressed against the circumference of the large roller 48 by the spring 55 and thus brake this roller when the rack 54 is pulled toward the slide 31 (Fig. 10). The brake 57 may be adjustable along the rack 54. As the slide 31 moves back, the rack 54 is pushed back into its initial position, without exerting any turning moment upon the roller 48, and is held there by the pin 56.

Before the knot is slipped around the open end of the container or casing, it is necessary to prepare the open end for the tying. Especially in the case of artificial sausage casing, a pleasing appearance of the end of the casings and a fat-tight closure are necessary. To comply with these requirements, a narrow transverse strip of the casing is folded back to form a fourfold wall thickness. This folding is combined with the feeding of the casing into the machine and is performed by the transfer device G (see Fig. 1). Immediately thereafter the folded end is plaited in pleats of uniform depth before it is tied.

The plaiting device E (Figs. 1, 11 and 12) passes through the tubing 9 and consists essentially of two groups 58 and 59 of plaiting blades 60, which groups of blades face each other. The blades of both groups are pivotally mounted at one end on a common shaft such as the pin 61 which is movable transversely in a horizontal plane, and are provided with return springs (not shown). When the pin 61 moves in the direction of the longitudinal axis of the plaiting blades or tubing, the blades of the two groups move between two parallel pins 62 mounted on the machine frame symmetrically to the plane of movement of the plaiting mechanism E and are sequentially moved toward each other, by the cooperation of the pins 62 with cams 63 on the blades 60 in pincer movement.

Each group of blades is formed of any desired number of blades For instance, the upper group 58 may consist of an odd number so that there is the same number of blades 60 on each side of a central blade 64, whereas the other group 59 may consist of an even number of blades which enter between the blades 60 of the upper group 58 and similarly receive the blades 60 of the group 58 between themselves The blades are flat strips of steel of equal length and little thickness with plaiting edges suitably shaped according to the desired shape of the folds. The plaiting blades have a drilled hole at one end, which holes receive the pin 61 that constitutes the common pivot The plaiting blades are threaded on the pin 61 so that a blade of one group alternates with a blade of the other group Adjacent plaiting blades are separated by a distance which corresponds approximately to the wall thickness of the casing or is slightly larger in order to avoid binding and tearing of the casing during the plaiting process The necessary distance may be maintained, for example, by washers which are alternatingly assembled with the plaiting blades on the pin 61 The backs of the plaiting blades are provided at the ends remote from the axis of rotation with cams 63, the starting surfaces of which are on the side of the pivot pin. The cams 63 extend to the free end of the plaiting blades and are of varying length. The cam of the central blade 64 of the odd-numbered group 59 is of the greatest length so that the distance of the starting surface of the cam from the pivot pin 61 is smallest, whereas the cams 63 of the blades 60 on either side of the central blade 64 become symmetrically shorter toward the outside so that the distances of their starting surfaces from the pivot pin increase accordingly. There are two cams of equal size and two starting surfaces of equal distance from the pivot pin 61 or the pin 62, which are symmetrical relative to the central blade 64. The plaiting of the casing starts at the central blade and moves from there toward the outside, and one pair of blades 60 after another, also from the center toward the outside and symmetrical to the central blade 64, is made to lap over. With this arrangement it is impossible for the casing to be clamped simultaneously at both sides of a fold as long as the fold is not completed so that tearing of the casing cannot occur even at high rates of operation.

Figure 11:
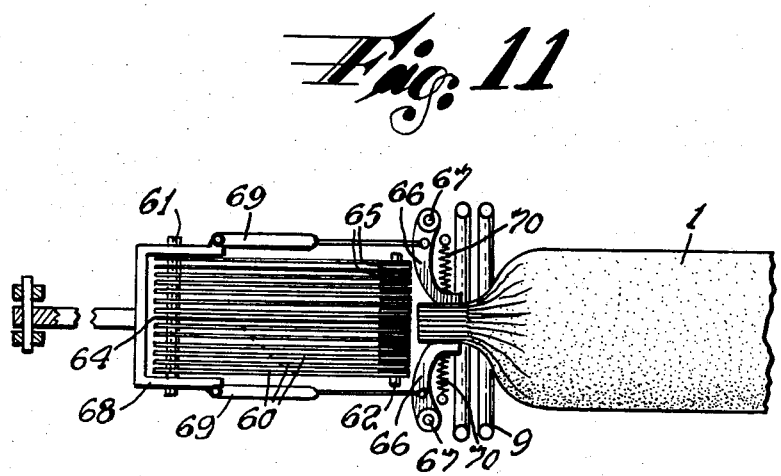
Fig. 11 is a plan view of the plaiting device.

The plaiting device E is also operated from the output shaft 5 of the transmission 4, using suitable intermediate members which act on the pin 61 as shown in Fig. 11.

Near the stationary pins 62 which cooperate with the cams 63 of the plaiting blades, thin metal sheets 65 are provided in the free spaces between the individual blades. They are held by the pins 62 and serve to strip the finished plaited casings and to properly position the plaiting device in the tubing 9 before tying.

After the withdrawal of the plaiting device E, the individual pleats of a casing occupy the width of a group of plaiting blades and do not lie tightly upon each other. A pressing device F is, therefore, provided, which is connected with the plaiting device E. This press comprises two levers 66 (see Fig. 11) which are mounted on the machine frame on the sides of the plaiting device. Each of said levers is pivotally supported on a vertical bolt 67 and is connected with the free end of a U-shaped fork 68 by means of a connecting rod 69 which has a long slot. The fork 68 carries the pin 61 of the plaiting blades. Each press lever 66 is provided with a return spring 70 which operates in such a way that the two levers 66 are swung out, pulling the connecting rods 69 along, when the plaiting device E, while it opens, reaches through the tubing 9. The free end of a casing can then be grasped by the open pincers of blade groups 58 and 59 of the plaiting device.

Figure 12:
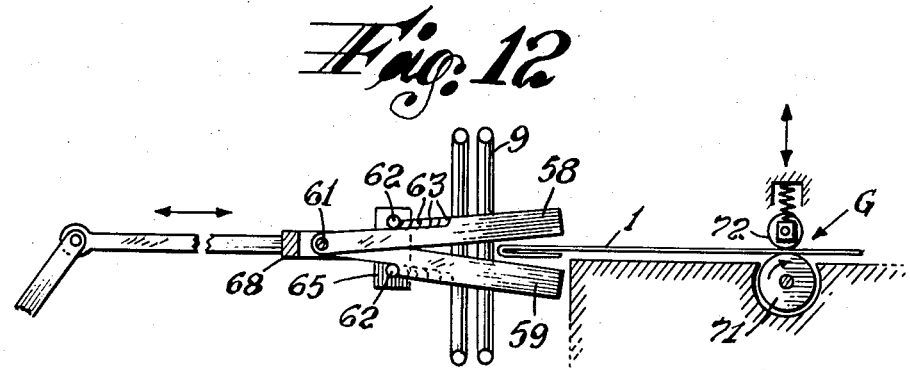
Fig. 12 is a side elevation of same.

Finally, there is an additional transfer device G consisting of two cylindrical rollers 71 and 72, which device serves to discharge the containers from the machine (Figs. 1 and 12). The roller 72 is supported by springs and vertically movable so that the container or casing, when the roller 72 is raised, may be brought by the other transfer device D to the proper place in front of the tubing 9 to be grasped by the plaiting device E. After tying, the roller 72 descends onto the roller 71 which is arranged to rotate about a stationary axis and is driven in the direction of the arrow indicated in Fig. 12, so that the tied container or casing is ejected from the machine.

The operation of our machine is as follows:

In order to prepare the machine for operation it is first necessary to pull the thread 12, as it comes from the ball or bobbin, between the two rollers 48 and 49 of the thread-measuring device C. This can easily be done since the rollers 48 and 49 are freely rotatable. Then the thread 12 is guided between the two rollers 33 and 34 of the thread-tensioning device B into the feed pipe 10. The machine is now ready to operate. The electric motor 2 is started and casing 1 is presented to the transfer device D which is actuated by the transmission shaft 5 and essentially consists of a pusher member reciprocably movable toward and away from the transfer device G. The pusher member serves to push the casing into the machine, that is, between the separated rollers 71 and 72 of the transfer or ejection device G, which latter device places the casing in front of the tubing loop 9 on the level of the axis of the tubing. A transverse strip of the end of casing, facing the tubing 9, is simultaneously folded over. Now the plaiting device E reaches through the tubing 9 and grasps the casing at the folded over end. While the latter is being plaited, starting from the central blade 64 and progressing toward both sides, it is pulled into the loop-shaped tubing until the completely plaited end comes to rest before the stripping sheets 65. Due to the continuing movement of the plaiting device E, the plaited casing end is then compressed by the two press levers 66. When it projects from the far side of the tubing 9, it is ready for tying.

Simultaneously, the slide 31 has been moved into its extreme position near the tubing 9 so that the feed pipe 10 with its tapered end engages the corresponding flared end 9b of the loop 9. Approximately simultaneously or with a slight delay, the discharge pipe 11 has moved its tapered end into engagement with the other end 9a of the loop-shaped tubing. When the discharge pipe 11 contacts the tubing 9, the preparation of the casing for tying is completed. As soon as a tight connection between the discharge pipe and the loop 9 is established, the telescopic rod 18, 18a moves against the cam 21 and causes the rod 22 which projects into the discharge pipe to rise, which opens the connection to the continuously running vacuum pump 3. The thread 12 is sucked through the tubing 9. Simultaneously with this aspiration, the bolt 56 releases the rack 54 of the thread-measuring device C and only the exactly measured length of thread can be aspirated. The thread 12 is spacedly looped around the casing in the shape of the desired knot. To tighten the knot, the swinging tube 16 is swung back, but first the thread 12 is clamped to the discharge pipe 11 by the rod 22, and the small roller 34 of the thread-tensioning device B is made to contact the larger roller 33 by means of the fixed stop 42 located near the tubing 9 when the slide 31 starts to move backward. As the feed pipe 10 continues to move away from the tubing 9, the thread 12 is pulled out through the slit 13 in the loops and is placed around the plaited end of the casing. The tension of the thread is determined by the slip clutch 46 of the thread-tensioning device B. As soon as the slide 31 completes its return stroke and reaches its extreme position remote from the tubing 9, the thread 12 is cut by the shears 47 in front of the tip of the feed pipe 10 which is now free. The other end of the thread 12 is released inside the discharge pipe 11 by raising the rod 22 which is actuated by the cam 21 as it is pressed against the stationary stop 25. The end of the casing is now tied. The smaller roller 72 of the ejecting device G is lowered on the casing, and the casing is discharged from the machine. During this time, the end of the thread 12 which projects from the feed pipe 10 is pulled slightly inside the pipe 10 by the larger roller 33 as the slide 31 returns to its final position, and the rack 54 of the thread-measuring device C is completely returned to its initial position in which the brake 57 is ineffective and the pin 56 can again engage the rack 54. The machine is now ready for a new tying cycle.

The embodiment illustrated in Figs. 1 to 12 is intended for the tying of pliable containers. A particular advantage of the machine according to the present invention consists in the fact that it can readily be modified to permit continuous operation, that is, the tying of full or empty pliable containers of any length. Continuous operations permit a simplification of the transfer devices since no transverse movement relative to the longitudinal axis of the loop-shaped tubing is needed.

In order to permit a continuous passage of container tubing of any desired length through a loop shaped tubing, it is, however, necessary to replace the grasping plaiting device by one which permits the continuous passage of casing 1' (Figs. 13 to 15). Since the casing 1' is no longer cut, the two groups of blades 58', 59' no longer pivot in a pincer movement around a common axis of rotation, but they are arranged initially facing each other at a distance determined by the diameter of the full or empty casing which is to be plaited. The individual plaiting blades 60' of each group 58', 59' are elongated pieces of steel strip of small thickness, and are supported between parallel stationary guides 73 for longitudinal movement toward and away from each other. The blades of each group are equipped with return springs for pulling the blades out of the meshing engagement with the blades of the opposite group, that is, back from the plaiting position. The ends of the blades which are remote from the other group are urged by the return springs against individual cams 63'. All cams 63' of each of the groups 58' and 59' are mounted on a cam shaft 74 which is rotatably mounted on the machine frame which also carries the parallel guides 73. When the drive shafts 74 turn, the plaiting blades 60' are moved by the cams 63' against the action of their return springs toward the casing 1'. The casing is plaited as the blades of both groups mesh with each other. The shafts 74 are preferably linked, for example, by gears, so that the two groups 58' and 59' of plaiting blades are forced to mesh in a fixed predetermined pattern. The cams 63' are similarly designed as the cams of the plaiting blades 60 and 64 of the first described embodiment, that is, the cams 63' for the central blade 64' has the longest circumference whereas the length of the circumference of the cams for pairs of blades 60' decreases symmetrically as the distance from the central blade 64' increases, so that as in the first embodiment the central blade is moved first during plaiting and the other blades follow in pairs progressing outwardly from the center.

If the cams 63' and the plaiting blades 60' and 64' are of uniform height, the casing 1' is plaited into folds of equal width. When working with synthetic sausage casing, this type of pleats will make a tight seal only when the edges which are to be sealed have first been folded over.

In order to achieve a fat-tight closure without a transverse fold, the invention provides a special plaiting device with cams and/or plaiting blades of varying height. The total height between a plaiting edge of a blade and the back of the corresponding cam in the forward or plaiting position is decreased gradually from the center blade toward the outside of each group by decreasing the effective height of the cams or by gradually increasing the spacing of the blades in a direction away from the center blade, so that the container will be plaited in a pattern of continuously decreasing width of pleat from the central blade toward both sides. Such a container end is of approximately circular cross section after pressing and is practically completely tight after tying so that appreciable savings in material are achieved by the elimination of a folded edge, and the inspection for leaking containers becomes unnecessary, the closure being always tight. A plaiting device operating in the manner just described ensures a continuous and uniform production of perfectly tied casings. It is of particular advantage to provide plaiting blades twice as long as the individual plaited casing end portion. In this case a tubing loop 9' is provided both before and behind the plaiting device in the direction of travel of the casing, so that in each cycle of operation a twin closure is formed which is then halved by cutting approximately through the middle, as indicated by the dot-dash lines in Fig. 16. This arrangement makes for very fast and economical tying of filled or unfilled casings. Empty casings have to be cut not only through the center of the plaited section but also through the center of the flat section between two plaited sections.

Where two tubing loops 9' are arranged at a distance from each other, the two respective feed pipes 10' and discharge pipes 11' are preferably connected by links 75 and are moved together. Only one thread collector, a single thread-tensioning device, and a single thread-measuring device will be needed. Obviously, this design, using two tubings 9' requires two press jaws 76 located between the tubings and moving horizontally against each other at right angles to the common axis of the loop-shaped tubings in the rhythm of the operating cycle in order to compress the folds after plaiting of the casing.

When empty (flat) or only slightly filled casings are to be tied, the loop-shaped tubings may be of rectangular shape with well rounded corners, loosely surrounding the casings.

We claim:

1. A machine for tying an end portion of a pliable container with a thread or the like, comprising in combination, a support; a knot forming device and a pleating device mounted on said support for movement relative to each other; said knot forming device including an elongated tubular member looped into the embryo shape of the knot to be tied, the loop defining an axial passage having two open ends and said member being formed with a longitudinal slit in said passage, and a source of fluid under pressure communicating with one end of said tubular member for longitudinally propelling a thread through said member by means of said fluid, whereby said thread is shaped into the embryo shape of the knot to be tied; and said pleating device including a carrier, a plurality of pleating blades, each having an edge portion, and mounted on said carrier to form two groups of blades movable relative to each other between a first position in which the edge portions of said groups of blades spacedly face each other, and a second position in which said edge portions of said groups of blades are meshed to define a plait pattern therebetween, and actuating means for simultaneously actuating movement of said blades between said first and second positions thereof and movement of said carrier axially relative to said passage in said looped tubular member in such a manner that said edge portions at least partially project from one of said open ends of said passage when in said first position thereof, and at least partially project from the other open end of said passage when in said second position, whereby an end portion of a pliable container fed to said one open end of said passage is grasped by said edge portions, pulled through said passage, simultaneously pleated, and positioned for subsequent tying of a knot by said knot tying device by the movements of said carrier and of said pleating blades.

2. In the machine according to claim 1, said knot forming device further including a thread-clamping device and a thread-tensioning device, said clamping device being arranged in the general plane of said looped tubular member on one side of the latter and including two clamping members, one of said clamping members being movable relative to the other to clamp the thread between the members, said tensioning device being arranged on another side of said tubular member opposite to said clamping device and including a slide movable substantially in the plane of said tubular member to and from the same, and means for holding the thread on said slide so that the thread, while being clamped tight by the clamping device, is tautened, when the slide is moved away from the tubular member, and caused to leave the tubular member through the slit of the latter and to tie the knot.

3. In the machine according to claim 2, said thread-tensioning device further including two rollers of different diameters, the larger roller being rotatably mounted on said slide, the smaller roller being pivoted to said slide for movement between a position of contact with said larger roller and a position spaced from said larger roller, and two abutments on said slide to limit said movement of the smaller roller.

4. In the machine according to claim 3, a shaft mounted on said slide and rotatably supporting said roller, a toothed wheel mounted on said shaft, a slip clutch connecting the toothed wheel and the larger roller, and a rack mounted on said support, the toothed wheel meshing with the rack.

5. In the machine according to claim 2, a vacuum pump, a discharge pipe, one end portion of said discharge pipe communicating with said vacuum pump, and a swinging pipe, an end portion of said swinging pipe communicating with and being angularly secured to said discharge pipe intermediate the end portions thereof, and another end portion of said swinging pipe being pivoted on said support, the other end portion of said discharge pipe moving into and out of airtight engagement with one of the longitudinal end portions of said tubular member when said swinging pipe pivots on said support.

6. In the machine according to claim 5, a compression spring and a rod within the swinging pipe, the spring normally bearing upon the rod to urge a portion thereof into said discharge pipe, a cam member pivoted on the swinging pipe and adapted to withdraw said rod against the force of the spring from said discharge pipe, and two stops limiting the pivoting movements of the cam member, said swinging pipe, spring, rod, cam member, and two stops constituting said thread-clamping device.

7. In the machine according to claim 1, said actuating means being arranged to successively actuate movement of said blades in such a manner that meshing of the two groups starts in the center of each group and progresses in outward direction, whereby pleating of the end portion of the container progresses from the center toward the outsides, while the container material is pulled from the outsides toward the center between the two groups of blades.

8. In the machine according to claim 7, a shaft mounted on said carrier, both groups of blades being pivotally mounted on the shaft for pincerlike motions.

9. In the machine according to claim 8, said actuating means including cam means for moving the blades of the two groups relatively to each other, said cam means abutting against respective portions of said blades opposite said edge portions thereof.

10. In the machine according to claim 8, a pressing device including two single-armed levers pivotally mounted on said support alongside said groups of blades for movement of the free ends of said levers toward and away from each other, return springs urging said levers to move away from each other, rod means connecting said levers with said carrier in such a manner that the free ends of said levers are moved toward each other and into the path of movement of said pleating device by said rod means when said edge portions move from said first to said second position thereof, and are swung out of the path of said pleating device by the action of said springs when said edge portions move from said second to said first position thereof.

References Cited in the file of this patent

UNITED STATES PATENTS

| | | |
|---|---|---|
| 336,656 | McCreary et al. | Feb. 23, 1886 |
| 876,573 | Myers | Jan. 14, 1908 |
| 2,462,957 | Gunn | Mar. 1, 1949 |
| 2,484,390 | Thorpe et al. | Oct. 11, 1949 |
| 2,697,970 | Tipper | Dec. 28, 1954 |
| 2,760,226 | Bengtson | Aug. 28, 1956 |

FOREIGN PATENTS

| | | |
|---|---|---|
| 158,814 | Switzerland | Feb. 16, 1933 |